United States Patent [19]

Tibbe

[11] Patent Number: 4,756,554

[45] Date of Patent: Jul. 12, 1988

[54] CLAMPING DEVICE FOR MOTOR VEHICLE SAFETY BELTS

[75] Inventor: Günter Tibbe, Munich, Fed. Rep. of Germany

[73] Assignee: Tibbe KG, Erdweg, Fed. Rep. of Germany

[21] Appl. No.: 845,870

[22] PCT Filed: Jul. 9, 1985

[86] PCT No.: PCT/EP85/00336

§ 371 Date: Mar. 7, 1986

§ 102(e) Date: Mar. 7, 1986

[87] PCT Pub. No.: WO86/00585

PCT Pub. Date: Jan. 30, 1986

[30] Foreign Application Priority Data

Jul. 9, 1984 [DE] Fed. Rep. of Germany ....... 3425199

[51] Int. Cl.⁴ .............................................. B60G 22/00
[52] U.S. Cl. .................................. 280/806; 242/107.2
[58] Field of Search ............... 280/805, 806, 808, 801; 242/107.2; 297/476, 478, 480, 470

[56] References Cited

U.S. PATENT DOCUMENTS

| | | | |
|---|---|---|---|
| 3,504,867 | 4/1970 | Stevenson | 242/107.2 |
| 4,120,466 | 10/1978 | Adomeit | 280/806 |
| 4,208,770 | 6/1980 | Takada | 280/806 |
| 4,327,881 | 5/1982 | Föhl | 280/806 |
| 4,492,348 | 1/1985 | Ziv et al. | 280/806 |
| 4,550,951 | 11/1985 | Apri | 280/806 |
| 4,552,407 | 11/1985 | Takada | 280/806 |
| 4,624,422 | 11/1986 | Hollowell | 280/806 |

FOREIGN PATENT DOCUMENTS 3306434 8/1984 Fed. Rep. of Germany .

Primary Examiner—John J. Love
Assistant Examiner—Karin L. Ferriter
Attorney, Agent, or Firm—Ronald G. Goebel

[57] ABSTRACT

A clamping device for a motor vehicle safety belt comprising a housing (2) traversed by the safety belt strap (1) coming from a strap winding device, respectively, from its winding shaft, as well as a first and a second wedge (3,4) arranged in the housing (2). The first wedge (3) forms a deviation member for the strap (1) on the side opposite to the strap winding device, respectively, to its winding shaft, and is provided with two skewed surfaces (12,13) delimiting a sharp angle and differently inclined with respect to the medial plane (16) of the first wedge (3) parallel to the strap (1) in the housing (2). By means of the inclined surface (13) delimiting with the medial plane (16) a larger angle, the first wedge (3) bears against a correspondingly inclined surface (15) of the housing (2) and, by means of the other inclined surface (12), against a correspondingly inclined surface (14) of the second wedge (4). When the strap tension exceeds a predetermined value, the first wedge (3) may move against the action of a spring load (21) in parallel to the strap (1) in the housing (2) along the skewed surface (15) thereof and thereby pushes the second wedge (4) against the strap (1) so as to clamp it in the housing (2).

14 Claims, 4 Drawing Sheets

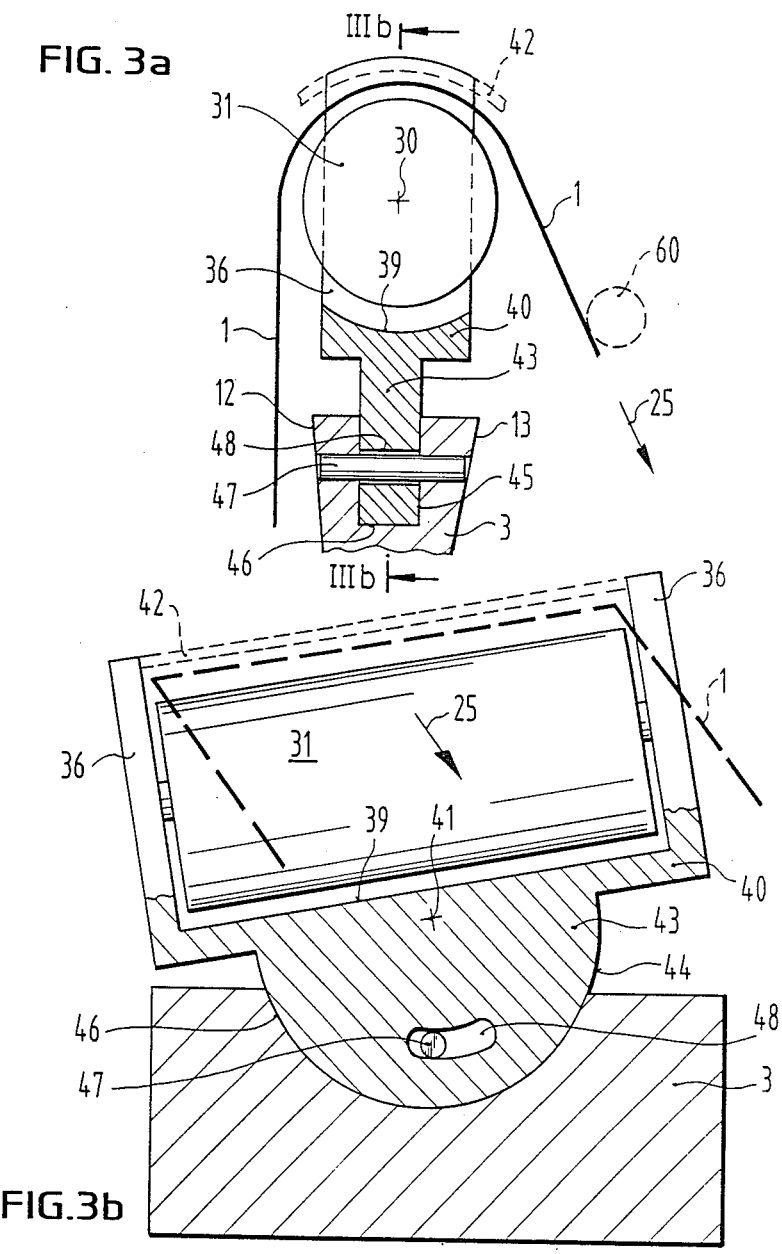

CLAMPING DEVICE FOR MOTOR VEHICLE SAFETY BELTS

The invention relates to a clamping device for a motor vehicle safety belt.

Motor vehicle safety belt systems with a safety belt take-up device are known. The take-up device is secured to the motor vehicle and has a wind shaft on which the safety belt is kept in a wound up condition when the system is not in use. On putting on the safety belt, the user pulls it from the take-up device against the action of at least one winding spring acting on the wind shaft and when the safety belt is taken off the spring turns the wind shaft in the opposite direction so that the belt is wound back onto it and is taken up by the take-up device. When the belt is fastened on the user the wind shaft is normally able to be turned in order to give the occupant of the motor vehicle using the belt a certain freedom of movement. It is only when the motor vehicle is subject to a certain degree of deceleration that the wind shaft is locked so that it is no longer able to turn in that direction in which the belt would be payed-off from the take-up device.

Furthermore, clamping devices have been proposed for such motor vehicle safety belt systems which serve to provide an additional clamping effect on the belt extending from the wind shaft of the take-up device after the shaft has been locked, this clamping action being to prevent further motion of the safety belt in the pay-off direction owing to the coil of the belt on the locked wind shaft becoming more tightly wound.

Such known clamping devices are made part of the belt deflecting fitting, which is attached on a B column of a motor vehicle for deflecting the belt which comes from the take-up device placed at the foot of the column and extends, when in use, diagonally over the shoulder and the chest of the motor vehicle occupant using it. Such clamping devices have two clamping members each in the form of a wedge, and a housing in the form of a rectangular sleeve on a base plate, which may be fixed to the vehicle, through which housing the belt coming from the take-up device extends before being trained around an annular deflecting member. The deflecting member may be joined by a sort of universal joint with a slide, which is able to be moved on the base plate in the direction of its length and which on the end projecting from the housing and facing away from the deflecting member is provided with a first wedge, which on the side turned away from the base plate has an oblique surface that is inclined in relation to the base plate and to the belt extending parallel thereto through the housing. Between this oblique surface, whose distance from the base plate becomes larger towards the deflecting member, and the safety belt a second wedge is arranged in the housing, and this second wedge on the one side makes contact with a correspondingly inclined oblique surface on the inclined surface of the first wedge, and on the other side has a clamping surface, generally parallel to the belt, for the same and is slidingly guided in the housing in a direction normal to the oblique surfaces of the two wedges. Together with the first wedge this slide is spring loaded away from the second wedge, and the latter is urged away from the belt. Once a certain degree of belt tension is exceeded in operation, as will be the case every time the motor vehicle undergoes a certain degree of deceleration and the wind shaft of the take-up device is locked and the motor vehicle occupant using the safety belt is thrown forwards, the belt acting via the deflecting member draws the slide against the action of its spring loading downwards towards the housing so that the first wedge moves the second wedge against the action of its spring loading towards the belt and inner clamping surface of the front wall of the housing which is essentially parallel to the belt in order to clamp the belt in the housing between this clamping surface and the opposite clamping surface of the second wedge.

The object of the invention is to provide a clamping device of the type having two clamping members which has an extremely high speed of response but nevertheless makes it possible to produce extremely high belt clamping forces and has a simple, compact and sturdy design, that is to say, it may be produced at a low price, needs little space and is reliable. Furthermore it is to be free of any tendency to rattle.

In what follows some embodiments of the clamping device of the invention are described with reference to the accompanying drawings by way of example. Therein:

FIGS. 3a and 3b show the longitudinal section as in FIG. 1 and, respectively, the section taken on the line IIIb—IIIb of FIG. 3a of a further modification of the first wedge of the clamping device as in FIG. 1.

Figure 1:
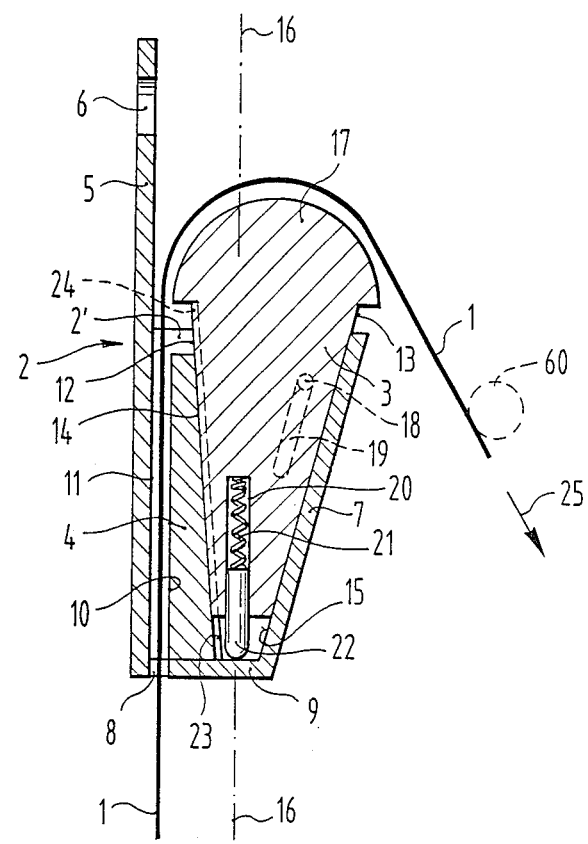
FIG. 1 is a longitudinal section of one embodiment.

The clamping device as shown in FIG. 1 is designed in the form of a belt deflecting fitting for the safety belt 1 of a motor vehicle safety belt system for a front seat having a safety belt take-up device and is secured to the B column of the motor vehicle adjacent to the front seat in order to so deflect the belt 1 coming from the take-up device (not illustrated) placed under the clamping device at the foot of the B-column so that, when the safety belt is in use, it extends diagonally over the shoulder and the chest of a motor vehicle occupant using it. The take-up device has a wind shaft loaded by at least one winding spring and onto which the belt is wound under the action of the wind spring or springs when the user removes the safety belt and furthermore a ratchet mechanism for locking the wind shaft at a certain deceleration of the motor vehicle and/or a certain acceleration of the belt in the direction of belt draw off from the take-up device so that the wind shaft is not able to turn any further in that direction. To accomplish this locking, the ratchet mechanism is actuated by a sensor responding to the deceleration of the motor vehicle or the acceleration of the belt.

The main parts of the clamping device as in FIG. 1 are a housing 2, a first clamping member or wedge 3 and a second clamping member or wedge 4. The two wedges 3 and 4 are arranged in the housing 2, which has the belt 1 coming from the take-up device running through it. The first wedge 3 serves to move the second wedge 4, which in turn serves to clamp the belt 1 in the housing 2.

The housing 2 is box-like in form and has a long flat base wall or base plate 5 to be secured to the motor vehicle. The base plate 5 has an aperture 6 to accept an attachment screw. Furthermore the housing 2 is provided with a front wall 7, that is inclined in relation to the base plate 5, and a transverse slot 8 in a bottom wall 9. The belt 1 extends through the transverse slot 8. The housing 2 is open on the side remote from the bottom wall 9.

The two wedges 3 and 4 are placed between the front wall 7 of the housing 2 and the belt 1 extending through same so that the first wedge 3 is adjacent to the front wall 7 and the second wedge 4 is adjacent to the belt. On the flat side adjacent to the belt 1 the second wedge 4 has a clamping surface 10 parallel to the belt 1 and which may be produced for example by roughening the respective face of the second wedge 4 or may take the form of a separate friction pad, that is secured to the second wedge 4. Furthermore the housing 2 on the base plate 5 is provided with such a clamping surface 11, which is opposite to the clamping surface 10 of the second wedge 4. Between the two clamping surfaces 10 and 11 the belt 1 extends through the housing 2.

The first wedge 3 forms a deflecting member for the belt 1. On the side adjacent to the front wall 7 of the housing 2 it is furnished with a first oblique surface 13 and on the side adjacent to the second wedge 4 it is provided with a second oblique surface 12. These oblique surfaces 12 and 13 each contact a respective inclined oblique surface 14 and 15, respectively, of the second wedge 4 and of the front wall 7, respectively and form an acute angle. The second oblique surface 12 of the first wedge 3 is at a comparatively small angle to the center plane 16, that is parallel to the belt 1 in the housing 2, of the first wedge 3, and the first oblique surface 13 of the first wedge 3 on the other hand makes a comparatively large, or at any rate larger angle.

At the broader end shown at the top in FIG. 1, the first wedge 3 is provided with a rounded head 17, which has the belt 1 trained around it, and the belt, when in use, extends from this position diagonally over the shoulder and the chest of the motor vehicle occupant using the belt, to a buckle, which is conncted with the floor of the motor vehicle. The first wedge 3 is guided in the housing 2 for motion parallel to its front wall 7 and the oblique surface 15, respectively, by means of two external transverse pins 18, shown in broken lines, which slide in two slots 19, also shown in broken lines, parallel to the front wall 7 and the oblique surface 15, respectively, in the two side walls 2' of the housing. Furthermore the first wedge 3 is spring loaded in a direction out of that wedge-shaped gap, which is delimited by or formed by the oblique surface 15 of the front wall 7 of the housing 2 on the one hand and the oblique surface 14 of the second wedge 4 on the other hand. For this purpose the first wedge 3 is provided with at least one blind hole 20 in its center plane 16, in which a pressure spring 21 and an axially sliding pressing pin 22 are arranged, which acts on the bottom wall 9 of the housing 2.

The second wedge 4 is so interlocked with the first wedge 3 that the two wedges 3 and 4 can slide on the two contacting oblique surfaces 12 and 14. To make this possible in the present case the second wedge 4 is provided with two ribs 23 and the first wedge 3 has two corresponding grooves 24 to receive one of these ribs 23 each, the ribs 23 and the grooves 24 extending parallel to the two contacting oblique surfaces 12 and 14 of the first wedge and of the second wedge 4, respectively. Instead of this, it would also be possible to have a suitably directed dove-tail joint between the two wedges 3 and 4.

In operation the clamping device shown in FIG. 1 functions as follows. Once the windshaft of the take-up device, not shown, has been locked because of a certain deceleration of the motor vehicle and/or a certain belt acceleration in the direction of belt pay-off from the take-up device and the belt tension as marked by arrow 25 exceeds a predetermined value, the belt 1 will press the first wedge 3 against the action of the pressure spring or the pressure springs 21 downwards in terms of FIG. 1. When this happens, the first wedge 3 will for its part press the second wedge 4, located on the bottom wall 9 of the housing 2, with its clamping surface 10 against the adjacent belt 1 and the latter against the clamping surface 11 of the housing 2 so that the belt 1 is firmly clamped in the housing 2. This clamping occurs extremely rapidly, since the first wedge 3 has two oblique surfaces, namely the two oblique surfaces 12 and 13, whose effects are summated on displacement of the second wedge 4 on the bottom wall 9 of the housing towards the belt, the contribution of the first oblique surface 13 sliding on the oblique surface 15 of the front wall 7 of the housing being greater owing to the greater slopes of these two oblique surfaces 13 and 15 in relation to the center plane 16 of the first wedge 3. Even in the event of this slope being made comparatively large in order to obtain very high speeds of response, it is nevertheless possible to produce extremely high belt clamping forces owing to the relatively small slope of the second oblique surface 12 of the first wedge 3 in relation to the center plane 16 thereof which slides on the correspondingly sloping oblique surface 14 of the second wedge 4. This slope may if desired be such that there will be a self-locking effect, since even in this case the pressure spring or pressure springs 21 will move the first wedge 3 back up again in terms of FIG. 1 as soon as the belt tension 25 decreases again so that the second wedge 4 runs to the right in terms of FIG. 1 and the two wedges 3 and 4 go into the release position to be seen in FIG. 1 in which the clamping device is released and without effect.

Figure 2A:
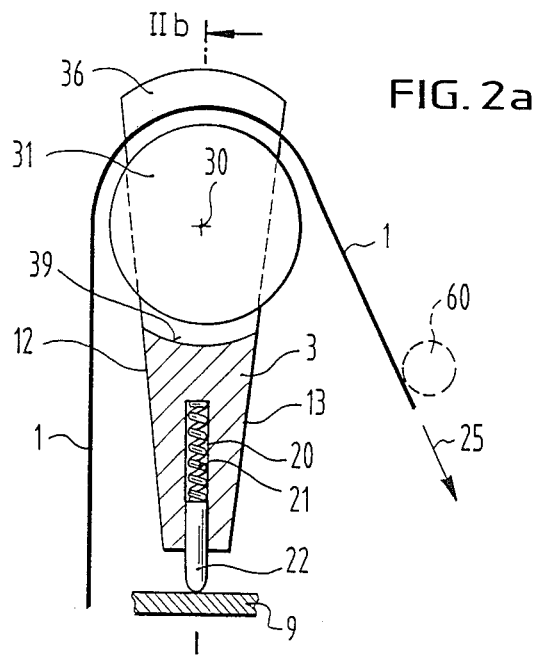
FIGS. 2a and 2b show such a longitudinal section as in FIG. 1 and, respectively, the section taken along the line IIb—IIb in FIG. 2a of a modification of the first wedge of the clamping device as in FIG. 1.
Figure 2B:
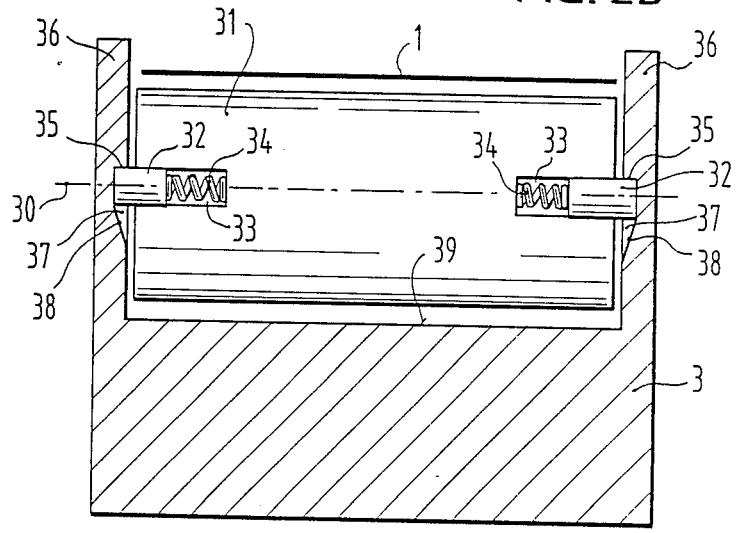

As shown in FIGS. 2a and 2b, in order to decrease the friction at the belt deflection point the first wedge 3 may have a head roller 31 turning about an axis 30 in place of the rounded head 17 and the belt 1 is then trained about the roller. The head roller 31 has two lateral trunnions 32 which each slide in a respective blind end hole 33 of the head roller 31 axially and are each acted upon by a pressure spring 34 arranged in the blind hole 33. Each trunnion extends into an inner blind hole 35 in an adjacent lug 36 of the first wedge 3 and from each of the two blind holes 35 in the two lugs 36 flanking the head roller 31 there extends a groove 37 towards the narrower end of the first wedge 3. Each groove 37 has an oblique bottom 38 to connect the respective blind hole 35 with the inner surface of the respective lug 36. When the clamping device is actuated on the predetermined belt tension being exceeded, the belt 1 will press the head roller 31 in a direction normal to the axis 30 of rotation against the action of the loading by the pressure springs 34 into engagement with a correspondingly concavely formed support surface 39 of the first wedge 3 underneath the head roller 31 so that the trunnions 32 do not have to resist the high force acting on the head roller 31 and will not fracture and instead this force is in fact directly transmitted from the head roller 31 to the first wedge 3. During this motion of the head roller 31 the two trunnions 32 will run on the oblique bottoms 38 of the grooves 37 and will be accordingly forced back into the blind holes 33 of the head roller 31 against the action of the pressure springs 34, which cause the return motion of the head roller 31 into the initial position as shown in FIGS. 2a and 2b in conjunction with the oblique bottoms 38 of the grooves 37 as soon as the belt tension 25 decreases again.

As will be seen from FIGS. 3a and 3b, the head roller 31 of the first wedge 3 may be mounted on a pivoting member 40, which is pivotally mounted on the first wedge 3 for rocking about an axis 41 perpendicular to its center plane 16 so that the head roller 31 may adjust itself in accordance with the direction of the belt tension 25. Furthermore, the rounded head 17 of the first wedge 3 in FIG. 1 may be provided on such a pivoting member 40, which may be provided with a cover 42, guiding the belt 1, for the rounded head 17 or the head roller 31, respectively, as is indicated in broken lines in FIGS. 3a and 3b.

As will be seen from FIGS. 3a and 3b, the pivoting member 40 provided with the two lugs 36 and the support surface 39, has a lower projection 43 with a part-circular outer surface 44, concentric to the axis 41 of pivoting, said lower projection being received in a recess 45 of the first wedge 3, which has a corresponding part-circular bottom 46, on which the outer surface 44 of the projection 43 of the pivoting member 40 can slide when the member 40 is pivoted about the virtual axis 41. The pivoting member 40 is connected by a transverse pin 47, parallel to the axis 41 of pivoting, with the first wedge 3, which is fitted into the latter and extends with play through a part-circular slot 48, concentric to the axis 41 of pivoting, in the projection 43 of the pivoting member 40.

Figure 4:
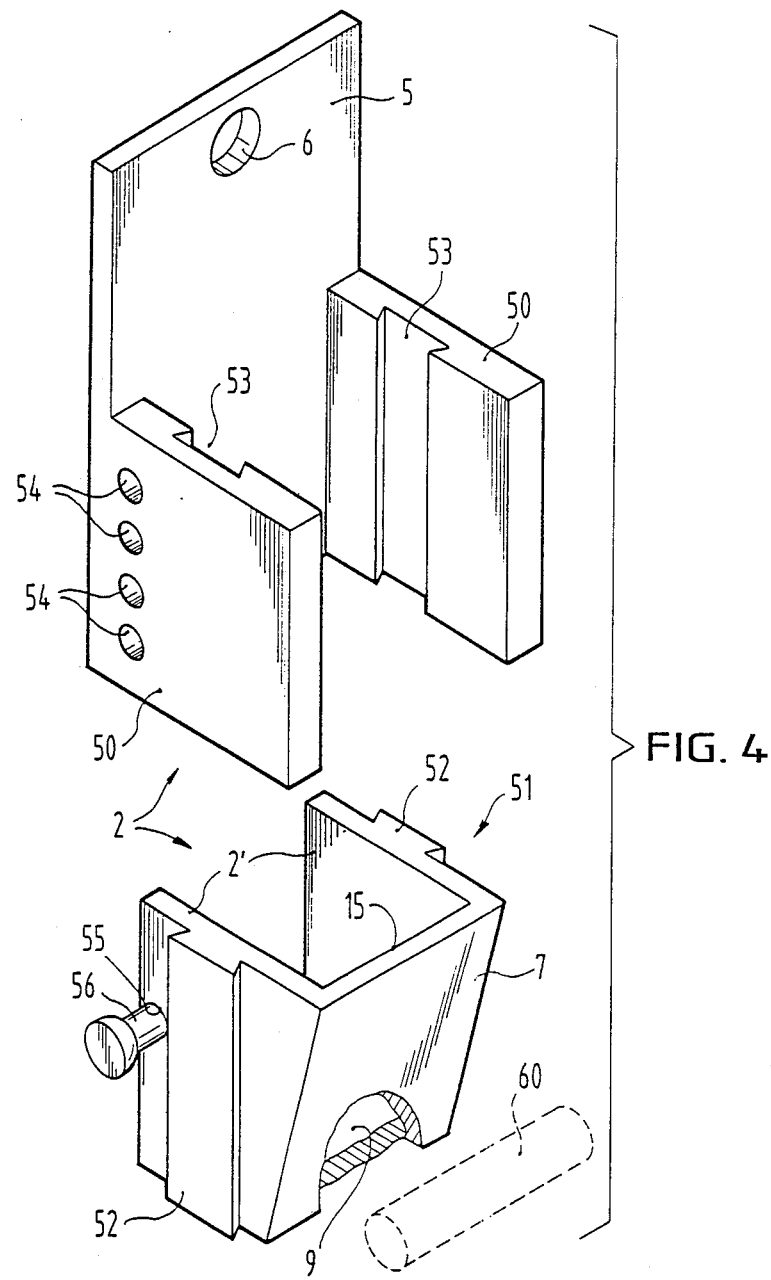
FIG. 4 is an exploded view of a modification of the housing of the clamping device as in FIG. 1.

As will be seen from FIG. 4 the housing 2 may be made in two parts for adjustment of the level of the point of deflecting the belt. In the present case shown, the housing is formed by the base plate 5 adapted to be secured to the motor vehicle and which has to mutually parallel side limbs 50, and a U-shaped socket 51 to receive the two wedges 3 and 4 and which is adjustably placed on the base plate 5 and has the two side walls 2', the front wall 7 with the oblique surface 15 and the bottom wall 9 of the housing 2. The socket 51 can be displaced between the two side limbs 50 of the base plate 5 on the same and at the two side walls 2' is provided in each case with an outside, dove-tail-shaped longitudinal key 52 which slides in an internal longitudinal groove 53, with a matching dove-tail form, in the adjacent side limb 50 of the base plate 5. To locate the socket 51 on the base plate 5 at different relative positions one side limb 50 of the base plate 5 has a row of holes 54 and the adjacent side wall 2' of the socket 51 has a hole 55 in which a pin 56 may be inserted through the hole 54, each case in line with the hole 55, of the row of holes in the side limb 50 of the base plate 5. Instead of this the row of holes 54 may be provided in a side wall 2' of the socket 51 and the single hole 55 may be provided in the adjacent side limb 50 of the base plate 5, it also being possible for the two side limbs 50 of the base plate 5 and the two side walls 2' of the socket 51 to be designed as stated in order to lock the socket 51 on the two sides of the base plate 5.

It is not essential for the clamping device to be designed as a belt deflecting fitting as shown and described and it may also be integrated into the safety belt take-up device. It is quite possible for the housing 2 and the two wedges 3 and 4 to be placed in the take-up device behind its wind shaft instead of designing them as a belt deflecting fitting or integrating them in it.

Although it is preferred to have the two wedges 3 and 4 as clamping members, it is also possible to have other clamping members or only one moving clamping member. It is primarily important in the clamping device of the invention that there is a clamping member to be moved in the housing 2 into a generally self-locking clamping position in order to clamp the belt 1 and that the belt clamping member itself or a further clamping member cooperating with it can be moved into an intermediate position, in which the self-locking action is reliably overcome so that the belt clamping member may be moved back into the release position to free the belt. It is for example possible to provide an eccentrically mounted roller as belt clamping member which is adapted to be pivoted into the clamping position and which itself may be moved out of its clamping position in a direction normal to the belt 1 or which cooperates with a further clamping member disposed on the other side of the belt 1, and adapted to be moved away from the belt 1 in a direction normal thereto, in order to make possible the pivoting back into the release position for freeing the belt.

In the case of the design of the clamping device as a belt deflecting fitting it is possible to provide a guide 60, shown in broken lines for the belt 1, said guide ensuring a sufficient angle of wrap of the belt about the head 17 or the head roller 31, respectively, of the first wedge 3. The guide 60 may take the form of an eye, which may be pivoted on the housing 2 or the base plate 5 thereof, preferably in a manner such as to be adjusted in level or on a separate base plate preferably vertically adjustable on the respective motor vehicle, or on the vertically adjustable socket 51 of the housing 2.

I claim:

1. A clamping device for a motor vehicle safety belt comprising:
   (a) a housing having a flat base wall along which said belt passes, an oblique front wall and a bottom wall;
   (b) a first clamping member located in said housing having a first oblique surface slidably movable along said oblique front wall of the housing and a second oblique surface;
   (c) a second clamping member located in said housing having an oblique surface slidably movable along the second oblique surface of said first clamping member and a flat surface along which said belt passes, said oblique and flat surfaces respectively of the second clamping member forming an angle smaller than the angle formed by said first and second oblique surfaces of the first clamping member; and
   (d) means for biasing said first clamping member in a direction away from the bottom wall of said housing, whereby said second clamping member is urged by said first clamping member to clamp said belt by said flat surface of the second clamping member against the flat base wall of said housing, when the first clamping member is moved by the belt towards said bottom wall of the housing in response to a predetermined belt tension.

2. The clamping device of claim 1 wherein the second oblique surface of said first clamping member and the oblique surface of said second clamping member are in contact and are inclined in relation to said belt, said second oblique surface and the first oblique surface of the first clamping member forming an acute angle, said first oblique surface and a plane parallel to the belt forming a second acute angle which is greater than the angle formed by said second oblique surface and said plane and the first clamping member being movable in said housing in a direction towards which said first and second oblique surfaces converge to effect displacement of said first clamping member parallel to the belt against the action of said means for biasing when said predetermined belt tension occurs.

3. The clamping device of claim 1 wherein said first clamping member is guided in a direction parallel to the oblique front wall of said housing and is spring loaded in a direction out of the wedge-shaped gap between the oblique front wall and the oblique surface of said second clamping member which is so interlocked with the first clamping member that the clamping members may slide on each other at the two contacting oblique surfaces thereof.

4. The clamping device of claim 1 wherein said first clamping member has a rounded head around which said belt is trained.

5. The clamping device of claim 1 wherein said first clamping member has a rotating head roller mounted thereon which has said belt trained around it.

6. The clamping device of claim 5 wherein said head roller is adapted to be moved in a direction normal to the axis of rotation against the action of spring loading means into engagement with a preferably matchingly concave support surface of said clamping member.

7. The clamping device of claim 1 wherein said housing and said first and second clamping members are designed in the form of a belt deflecting fitting.

8. The clamping device of claim 7 wherein said housing is made in two parts for level adjustment of the point of deflection of the belt to include a base plate adapted to be secured to the motor vehicle and a socket to receive said first and second clamping members and adapted to be shifted on the base plate.

9. The clamping device of claim 8 wherein said base plate has two mutually parallel side limbs between which said U-shaped socket is slidable along the base plate, one side limb of the base plate or one side wall of the socket having a row of holes and the adjacent side wall of the socket or the adjacent side limb of the base plate respectively, having a hole, a pin being adapted to be inserted into the latter and into the hole respectively aligned therewith of the row of holes, in order to locate the socket on the base plate.

10. The clamping device of claim 9 wherein there is a dove-tail guide between each side limb of said base plate and the adjacent side walls of said socket.

11. The clamping device of claim 7 wherein there is provided a vertically adjustable guide for said belt for increasing the angle of wrap of the belt around a rounded head or a rotatably mounted head roller of said first clamping member around which the belt is trained.

12. The clamping device of claim 7 wherein said first clamping member is provided with a pivoting member rockingly supported for tilting about an axis normal to the plane, parallel to said belt, of the first clamping member and being provided with a rounded head or a rotatably mounted head roller around which the belt is trained.

13. The clamping device of claim 12 wherein said pivoting member has a cover guiding the belt for said head or said head roller, respectively.

14. The clamping device of claim 1 wherein said housing and said first and second clamping members are arranged in a take-up device for said belt.

* * * * *